INVENTOR.
EARL O. SCHWEITZER
BY
ATTORNEY

Aug. 9, 1966  E. O. SCHWEITZER  3,266,048
RECORDER AND INKING SYSTEM THEREFOR
Original Filed March 15, 1963  3 Sheets-Sheet 2

INVENTOR.
EARL O. SCHWEITZER
BY
ATTORNEY

Aug. 9, 1966     E. O. SCHWEITZER     3,266,048

RECORDER AND INKING SYSTEM THEREFOR

Original Filed March 15, 1963     3 Sheets-Sheet 3

INVENTOR.
EARL O. SCHWEITZER
BY
ATTORNEY

United States Patent Office 3,266,048
Patented August 9, 1966

3,266,048
RECORDER AND INKING SYSTEM THEREFOR
Earl O. Schweitzer, Wickliffe, Ohio, assignor to Clevite Corporation, a corporation of Ohio
Continuation of application Ser. No. 265,394, Mar. 15, 1963. This application July 12, 1965, Ser. No. 471,067
21 Claims. (Cl. 346—140)

This invention relates to recording devices and more particularly to an improved writing system for a pen recorder having a movable record medium.

This application is a continuation of my patent application Serial No. 265,394, filed March 15, 1963, for Recorder and Inking System Therefor.

In United States Paent No. 3,054,109, assigned to the same assignee as the present invention, there is disclosed in connection with an oscillographic recorder, a pressurized ink feed system. The present invention contemplates certain improvements to the pressurized inking system disclosed in said patent and additional improved recorder features.

The writing system disclosed in the aforementioned patent basically comprises one or more writing pens having a tubular tip, the entire periphery of which is effectively sealed against the surface of the record medium during a writing operation. A pressurized source of writing ink is connected to an ink supply manifold for the pen, the latter being biased against the record medium with sufficient force that the ink pressure is insufficient to break the effective seal. A shut-off valve is provided to selectively connect or disconnect the pressurized ink source to the ink manifold.

As is known to those skilled in the art the inking system disclosed in the aforementioned patent is advantageously independent of gravitational and acceleration forces, temperature and altitude effects, and substantially eliminates drying and clogging of the ink within the pen. However, even though the system has resulted in a substantial advance in the recording art, it has been found to be subject to several operational characteristics which are objectionable in some instances. One objectionable characteristic is that even after closure of the aforementioned shut-off valve a remanent pressure exists between the shut-off valve and pen tip which causes ink to be discharged from the pen tip when the pin is lifted for servicing, etc.

Another characteristic encountered in a multi-pen recorder having a single ink manifold connected to supply a plurality of pens is the tendency of one pen when removed from contact with the record medium to act as a vent for the manifold resulting in ink leakage from the other pens under the influence of gravity even in the absence of the remanent pressure condition. Such characteristics have been found to render pen servicing and replacement of the record medium difficult.

It is accordingly a principal object of the present invention to provide an improved pressured ink writing system for a recorder.

Another object of the invention is to automatically relieve the remanent pressure in a pressurized ink writing system after a source of pressurized ink is disconnected from the system.

Another object of the invention is to provide an improved pressure relief valve.

Another object of the invention is to provide an improved ink manifold for a multi-pen recorder having means for individually controlling the flow of ink to the pens and means for simultaneously terminating the supply of ink to all the pens.

Another object of the invention is to terminate the supply of ink to all pens of a multi-pen recorder in response to opening of a record medium access drawer.

Still another object of the invention is to provide an improved record medium support assembly and an improved drawer mounting thereof.

Other objects and advantages will become apparent from the following description taken in connection with the accompanying drawings wherein.

Figure 1:
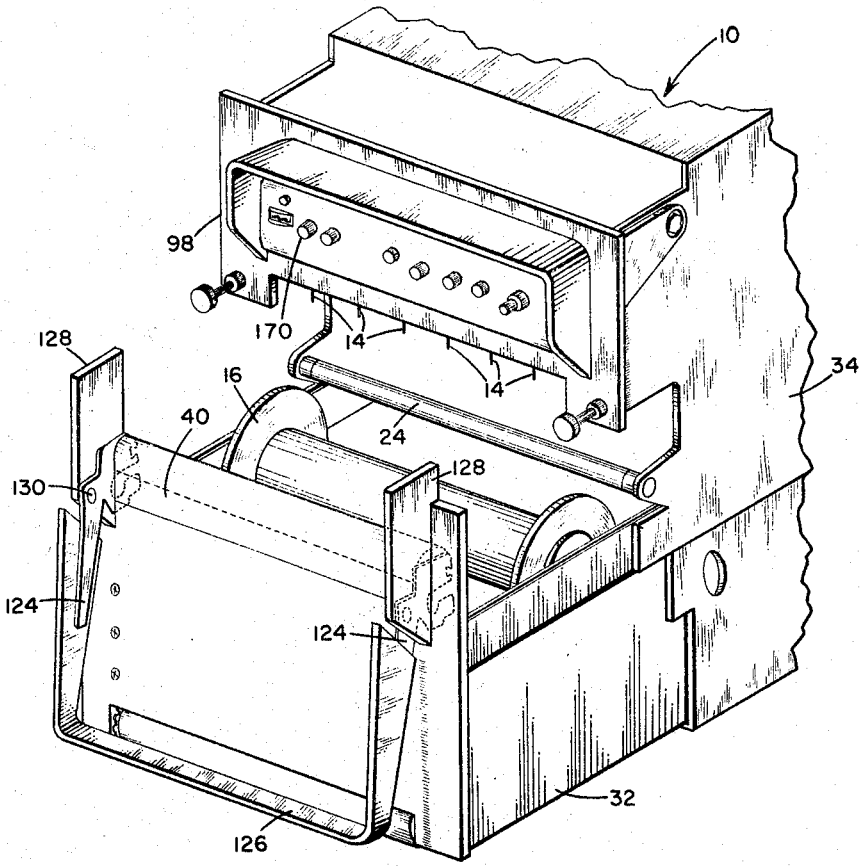
FIGURE 1 is a perspective view of a recorder with the record medium supporting drawer withdrawn.
Figure 2:
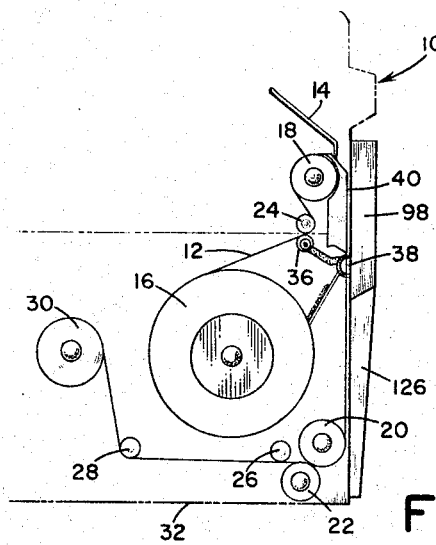
FIGURE 2 is a schematic side view of the recorder shown in FIGURE 1 illustrating the record medium supporting means.

Referring to FIGURE 1 of the drawings there is shown a recorder identified generally by the reference numeral 10. While, as will be apparent to those skilled in the art, the inventive features are applicable to various types of recording devices, the particular recorder 10 disclosed for exemplary purposes comprises a high speed oscillographic pen recorder having a movable record medium or strip chart 12 adapted to be engaged and marked by a plurality of writing pens 14 (in this instance 6). The record medium 12 as shown most clearly in FIGURE 2 is stored on a main storage roller 16 and driven past the tips of pens 14 by means of guide rollers 18, 20 and 22, and guide bars 24, 26 and 28 and then stored on a rewind roller 30.

The rollers 16, 18, 20 and 22 and guide rods 26 and 28 are mounted in parallel axial relationship on a movable drawer 32 of the recorder 10 which may be withdrawn as shown in FIGURE 1 for purposes of servicing the parts supported thereby and replacing the record medium. Guide rod 24 on the other hand is fixedly supported between opposite side walls of the main recorder chassis 34 to engage the record medium 12 as shown in FIGURE 2 upon closure of the drawer 32.

Guide rod 24 upon closure of drawer 32 as will later be described functions to position the record medium 12 into engagement with an actuating arm 36 of a micro switch 38 to thereby apply closing pressure to switch 38. When the supply of record medium is exhausted through operation of the recorder 10 the actuating arm 36 will be released and switch 38 will be opened to terminate the supply of ink to pens 14 and de-energize the chart positioning means as will hereinafter be described in more detail.

By means of the parts thus far described the record medium 12 is positioned over a writing plate 40 to be marked by pens 14. It will be apparent that suitable motor means may be arranged to drive roller 30 to effect movement of record medium 12 at a uniform relatively constant velocity. Pens 14 each have a tubular tip 42 which engages the record medium 12 as it passes over surface 40 to leave an ink trace representative for example of the magnitude of a variable condition.

Figures 3, 8:
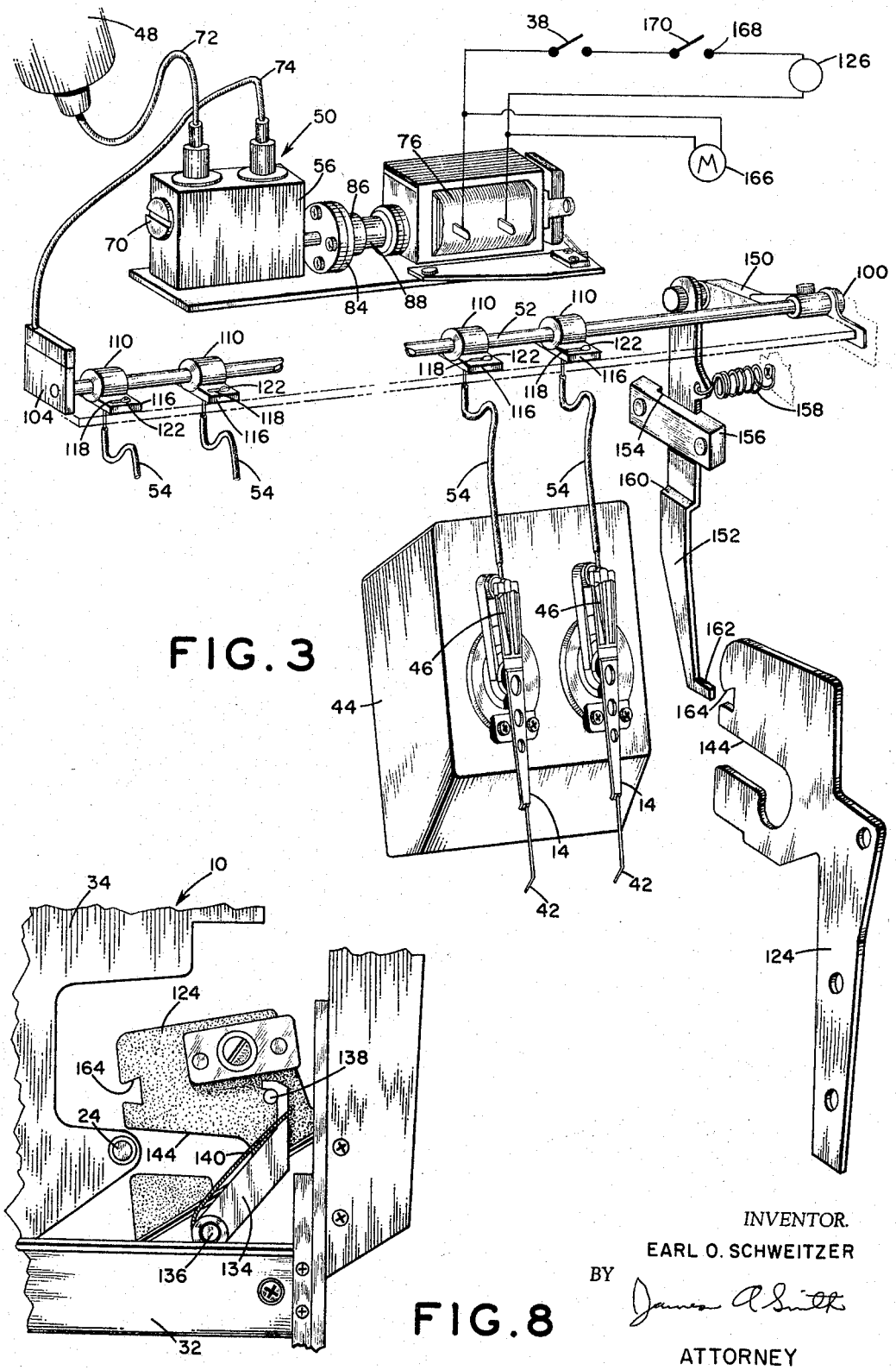
FIGURE 3 is a schematic illustration of an ink writing system for the recorder depicted in FIGURE 1.
FIGURE 8 is a side view of a portion of the recorder shown in FIGURE 1.

Each of the pens 14 as shown more clearly in FIGURE 3 is positioned relative to record medium 12 by means of a suitable pen supporting and driving mechanism contained within for example a housing 44 as illustrated in connection with the two pens shown in FIGURE 3. Preferably the driving and supporting mechanism includes biasing means such as a spring 46 for maintaining engagement of the tips 42 with the record medium 12 during a writing operation to insure an effective seal between the tips and the record medium.

Inasmuch as such pen positioning and support means are well known to those skilled in the art further description is deemed unnecessary.

The system depicted in FIGURE 3 for supplying liquid ink to pens 14 comprises in general a pressurized inking system which basically is similar to that disclosed in United States Patent No. 3,054,109. In general, the system includes a pressurized source of liquid ink comprising a can 48 containing ink maintained under pressure by gas therein or maintained under pressure by a pump or spring loaded piston. The ink source 48 is adapted to be connected by an electrically operative shut-off valve 50 to an ink manifold 52 which is rotatably supported at its ends on the juxtaposed side walls of chassis 34 for a purpose which will hereinafter be described. Ink is supplied to pens 14 from mainfold 52 by flexible conduits or tubes 54.

The inking system as thus far described functions as disclosed in the aforementioned patent to supply ink under pressure during a writing operation to the pen tips 42. During the writing operation the entire periphery of each pen tip 42 engages and forms an effective seal with the surface of the record medium 12. Preferably each pen tip 42 is biased against the surface of record medium 12 with sufficient force that the ink pressure is insufficient to break the seal thus established. The biasing force is correlated with the viscosity of the ink and the inherent resistances to flow of the viscous material. Accordingly, a balanced hydrostatic inking system is provided which feeds an adequate amount of the viscous ink to the pen tip, yet does not force excess amounts of the ink out of the pen in normal operation.

Considering now the specific features of the present invention it has been found that even after termination of the ink supply to pens 14 through closure of shut-off valve 50, a remanent pressure will remain in the system shown in FIGURE 3 between valve 50 and pen tips 42. If the pens 14 should be subsequently removed from engagement with the record medium 12 such as during replacement of the latter, ink will be discharged from the pens under the influence of the remanent pressure condition. I have found that this undesirable characteristic can be eliminated by providing means for automatically relieving the remanent pressure in response to closure of valve 50.

Figure 4:
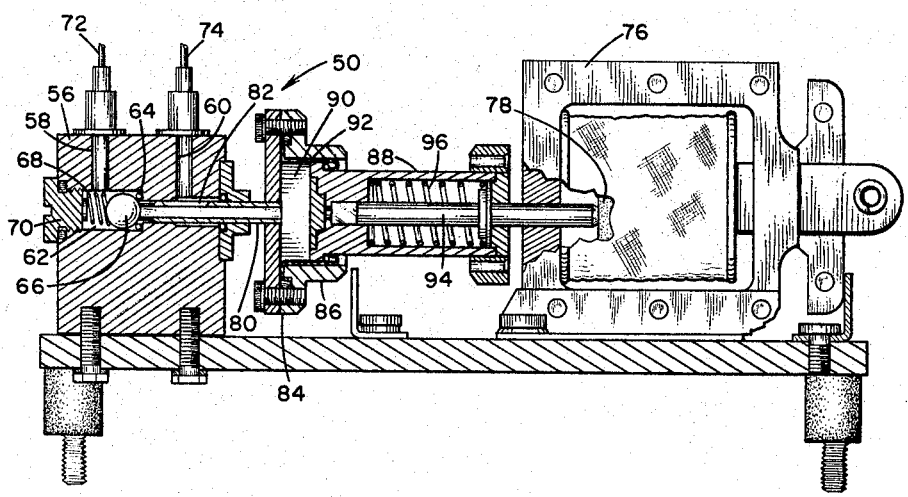
FIGURE 4 is a longitudinal sectional view of a pressure relief ink shut-off valve illustrated in FIGURE 3.

Referring now to the FIGURE 4 of the drawings which is a longitudinal view in partial section of the valve 50 depicted in FIGURE 3, there is shown a valve body 56 having drilled parallel inlet and outlet passages 58 and 60 intersecting with and in perpendicular relationship with a connecting passage 62 extending through the valve body 56. The passage 62 is provided with a suitable shoulder for supporting a valve seat 64 adapted to be engaged by a ball valve member 66 in the closed position of the latter. Valve member 66 is biased toward engagement with seat 64 by means of a coil spring 68 mounted in compression between valve member 66 and a plug and spring retainer 70 threaded in the left end of passage 62 to seal the same. Inlet passage 58 is connected by a flexible conduit or tube 72 to pressure source 48 as shown while outlet passage 60 is connected by a flexible tube 74 to the manifold 52, suitable fittings being provided as shown to facilitate the tubing connections. When valve member 66 is displaced to the left out of engagement with seat 64 against the bias of spring 68 communication will be established between ink source 48 and manifold 52. On the other hand, engagement of valve member 66 with seat 64 will terminate communication.

To position the valve member 66 relative to valve seat 64 an actuating device is provided which comprises in this instance an electric solenoid 76 having a movable core 78 adapted to be displaced to the left as viewed in FIGURE 4 upon energization of solenoid 76 by means of the circuitry hereinafter to be described. Motion is transmitted from solenoid core 78 by means of an actuating connection in which is incorporated the remanent pressure relieving means as will now be described.

Still referring to FIGURE 4 one end of a hollow actuating tube 80, which defines a longitudinal fluid passage, is slidably received in the right end of valve body passage 62 and engages valve member 66 for displacing the latter relative to valve seat 64. The tube 80 is preferably provided with a slot 82 in the wall thereof to establish communication between the inlet passage 58 and outlet passage 60 in the open position of valve member 66 and between the hollow interior of said tube and outlet passage 60 in the closed position of valve member 66 for a purpose hereinafter described. Clearance is provided between tube 80 and passage 60 as shown to insure free communication in the manner described. The right end of tube 80 is fixed and sealed within a central bore of an end cover plate 84 attached to the left flanged end of a short tubular movable housing 86. The tube 80, cover plate 84 and housing 86 thus define a movable sub-assembly displaceable as a unit during actuation of valve member 66.

Slidably received in the left end of tubular housing 86 is a second smaller diameter housing or piston 88, the left end of which defines a movable wall for an expansible and contractible chamber 90 within housing 86 between the cover plate 84 and said movable wall. The chamber 90 is sealed by means of a flexible tubular sealing diaphragm 92 formed from, for example, a silicon rubber material and having its left end clamped between cover plate 84 and housing 86 and its right end clamped to housing 88. The expansible and contractible chamber 90 is thus in communication with outlet passage 60 by means of tube 80 but is otherwise sealed. Displacement of housing 88 relative to housing 86 as will later be described in more detail serves to vary the volume of chamber 90.

To complete the operative connection between movable core 78 and valve member 66, an elongated actuating rod 94 is slidably received in the right end of housing 88 in coaxial relationship therewith and slidably received in a suitable bore in the housing of solenoid 76, the right end of rod 94 being engaged by solenoid core 78 as shown in FIGURE 4. The actuating rod 94 is biased to the right by a coil spring 96 mounted in compression between an interior shoulder of housing 88 and a spring retainer carried by rod 94.

In operation of the structure disclosed in FIGURE 4, the parts will assume the positions shown in the de-energized condition of solenoid 76. Upon energization of solenoid 76 movable core 78 will be displaced to the left to displace rod 94 to the left to compress spring 96. Housing 88 will accordingly be gradually displaced relative to housing 86 under the influence of the biasing force of spring 96 to reduce the volume of chamber 90 and engage the cover plate 84. When engagement of housing 86 with the cover plate 84 thus occurs, the assembly comprising housing 86 and tube 80 will be displaced to the left to move valve member 66 out of engagement with seat 64. As a result, communication will be established between passages 58 and 60 and the ink manifold 52 will be connected to the ink source 48.

It will be noted that during opening of valve member 66, spring 96 uniquely functions to permit instaneous full range displacement of solenoid core 78 and thus normal solenoid operation. The spring 96 when thus compressed by solenoid 76 exerts a biasing force on housing 88 greater than the displacing force of the ink pressure acting on housing 88 in the opposite sense. Accordingly, in the open position of valve member 66 the volume of chamber 90 will be reduced to substantially zero.

With valve member 66 in its open position a pressure will exist in the system disclosed in FIGURE 3 equal to the pressure of ink source 48 and the system is rendered operative for a writing operation.

When solenoid 76 is subsequently de-energized to terminate the connection of ink source 48 to manifold 52, the displacing force of core 78 and biasing force of spring 96 will be removed and the biasing force of spring 68 will tend to displace the assembly comprising valve member 66, tube 80, housing 86, housing 88 and rod 94 to the right toward solenoid 76 until valve member 66 engages seat 64 whereupon movement of tube 80 and housing 86 will close.

Closure of valve member 66 in the manner described will terminate communication between passages 58 and 60 and housings 86 and 88 will be free for relative displacement. The remanent pressure existing in the system between valve member 66 and the pen tips 42 will communicate with expansible chamber 90 by means of actuating tube 80 and tend to expand chamber 90 and displace housing 88 to the right relative to housing 86 to the position shown in FIGURE 4. The resulting increase in volume of chamber 90 will relieve the remanent pressure in the system. Accordingly, the pressure between valve member 66 and the pen tips will be reduced to substantially atmospheric pressure. Thus, by properly sizing chamber 90 complete pressure relief can be achieved automatically in response to closure of valve member 66.

Referring now to FIGURE 3 and the specific structure of the ink manifold and valve means associated therewith, the manifold tube 52 is rotatably supported in the upper portion of the recorder chassis in overlying relationship with pens 14 and positioning means therefor. The manifold assembly and pen positioning means are enclosed by a pivoted cover plate 98 which renders the parts non-visible in FIGURE 1. Cover plate 98 may be rotated upward to render the manifold valves now to be described accessible.

Manifold 52 comprises an elongated hollow tube having a suitable bearing assembly 100 adapted to be received in a suitable supporting bracket mounted on the interior surface of the chassis side wall. The left end of the manifold 52 is rotatably received and sealed in an ink supply fitting 104 adapted to be received in a bracket mounted on the interior surface of the opposite chassis side wall, the fitting 104 being connected to ink supply tube 74 to thereby establish communication between outlet passage 60 of valve body 56 and the interior of manifold 52.

To supply ink to pens 14 the manifold 52 is provided with a plurality of axially spaced openings or ports 108 (FIGURE 5) in the wall thereof corresponding in number and spacing to pens 14. Valve means comprising a plurality of sleeve valve members 110 are associated with ports 108 respectively to control the flow of ink from manifold 52 to pens 14. Specifically the sleeve valves 110 are formed from a suitable nylon or plastic material and are slidably mounted on the manifold 52 adjacent the ports 108 respectively. Each valve member 110 is provided with a tubular outlet fitting 112 having an outlet port or passage 114 adapted to be moved into and out of alignment with the associated manifold port 108 either by rectilinear displacement of the valve member axially of manifold 52 or by angular displacement of manifold 52 relative to the valve. The arrangement is such that each valve member 110 may be manually positioned axially of the manifold 52 to provide an independent ink shut-off means for each pen 14 while manifold 52 may be rotated relative to valve members 110 to terminate the supply of ink from manifold 52 to all pens simultaneously regardless of the positions of the valve members 110.

To accomplish the stated operation of the manifold and valve assembly, means are provided which permit limited rectilinear displacement of valve members 110 relative to manifold 52 and inhibit angular displacement of said valve members during angular displacement of manifold 52. Specifically, each valve member 110 is provided with an integral guide flange 116 (FIGURE 3) having a pair of elongated slots 118. When the valves 110 are positioned on the manifold 52 as shown in FIGURE 3 flanges 116 slidably engage the flat surface of a plate 120 mounted on the opposite side walls of chassis 34 in parallel relationship with manifold 52.

The range of movement of each valve member 110 relative to plate 120 is established by a pair of guide pins 122 received by slots 118 and fixed to plate 120. Each pin 122 is provided with a head or flange at its upper end of diameter greater than the width of the slot to retain the valve member 110 in engagement with the surface of plate 120 while permitting relative displacement of the valve member for a distance determined by the length of the slots.

Figure 5:
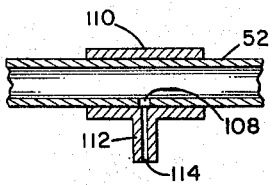
FIGURES 5, 6 and 7 are enlarged sectional views showing various control positions of the manifold shut-off valves illustrated in FIGURE 3.
Figure 6:
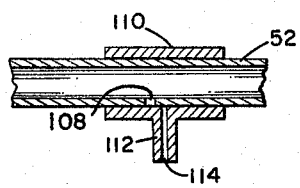
Figure 7:
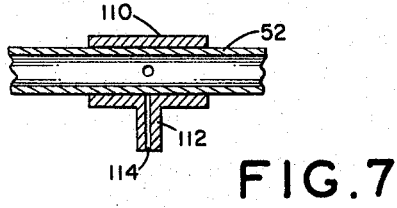

Referring now to FIGURES 5, 6 and 7 in addition to FIGURE 3, the pins 122 are positioned on plate 120 with respect to ports 108 and the dimensions of sleeve valve members 110 to cause the ports 108 to be aligned with outlet passages 114 as shown in FIGURE 5 when the valve members 110 are in their extreme left position relative to pins 122 as shown in FIGURE 3 and to cause the ports 108 to be out of alignment and communication as shown in FIGURE 6 in the extreme right position of the valve members 110. Accordingly, pins 122 and slots 118 determine the range of movement of valve members 110 and the open and closed positions thereof. It will be apparent that each valve 110 may be individually manually adjusted as desired between its open and closed positions to control the supply of ink to its associated pen 14.

Pins 122 in addition to determining the range of rectilinear displacement of valve members 110 serve to inhibit angular displacement of valve members 110 to thereby permit relative displacement of manifold 52 as previously mentioned. Referring specifically to FIGURE 7 it will be apparent that upon slight angular displacement of manifold 52 the manifold ports 108 will be displaced out of operative relationship with respect to valve outlet passages 114 thereby simultaneously closing all of the valves to completely terminate the supply of ink to pens 14.

The shut-off feature achieved by rotatably mounting manifold 52 provides as an additional safeguard against ink leakage from the pens 14. Even in the absence of the remanent pressure condition previously described there is a tendency for pen leakage to occur upon disengagement of the pens from the record medium as a result of one or more pens functioning as a vent for manifold 52 thereby permitting ink flow from manifold 52 to the other pen tips. Through rotation of manifold 52, however, to simultaneously disconnect all pens from the manifold, such a venting condition is effectively prevented.

Inasmuch as the last described leakage condition is encountered upon disengagement of the pen tips 42 from the record medium 12, means are provided for automatically angularly displacing manifold 52 to the position shown in FIGURE 7 in response to opening of drawer 32 to remove the record medium and supporting means therefor from an operative position with respect to pens 14. More specifically, the manifold displacing means as will now be described is associated with a unique latching and removal means for drawer 32 which in itself constitutes an advance in the recorder art and an inventive feature.

Referring now to FIGURE 1 of the drawings the rigid writing plate 40 where the record medium 12 is engaged by pens 14 is necessarily positioned to the rear of and above tips 42 in the closed position of drawer 32. Accordingly, if the plate 40 were fixedly supported on drawer 32 to be movable in a fixed plane therewith, interference of the surface 40 with the pen tips 42 would occur upon closing or withdrawal of the drawer 32.

To avoid interference between surface 40 and pens 14 the writing plate 40 and roller 18 are pivotally mounted on the drawer 32 and lowered during closure and removal of the drawer. More specifically, at the front of drawer 32 a pair of latching levers 124, rigidly connected by a U-shaped actuating arm 126, are pivotally mounted on supports 128 by pivot pins 130. Roller 18 is rotatably supported at its ends on levers 124 and writing plate 40 is fixed at its ends to levers 124 in front of roller 18 as shown more clearly in FIGURE 2. The center of gravity of the pivoted assembly is such that clockwise displacement as viewed in FIGURE 1 tends to occur in the free state of the assembly.

When the drawer 32 is withdrawn as shown in FIGURE 1, the pivoted assembly including levers 124 will be locked in the position shown by a lever 134 (FIGURE 8) which is pivotally mounted by a pivot pin 136 on the side of the drawer 32 and is adapted to engage a stop pin 138 fixed to the latching lever 124 at the left side of the drawer 32. A spring 140 serves to bias the lever 134 toward counter clockwise rotation on pin 136 as viewed in FIGURE 8.

In the open position of drawer 32 as shown in FIGURE 1 pin 138 attached to the left latching lever 124 is engaged by lever 134 to inhibit pivoted displacement of levers 124 and the assembly covered thereby. Accordingly, in the open position of drawer 32 the parts will be effectively locked in the positions shown in FIGURES 1 and 8. In this locked condition, the angular position of the assembly comprising latching levers 124, uniting plate 40, and roller 18 will be such that the assembly can be displaced inwardly without interference with pen tips 42.

Latching levers 124 are provided with L-shaped slots 144 which are adapted to slidably receive the chart guide rod 24 upon closure of drawer 32 and function in cooperation therewith to latch the drawer in a closed position and to effect upward angular displacement of writing plate 40 and roller 18 to their operative position with respect to pens 14. Upon closing movement of drawer 32 guide rod 24 is received in slots 144 as shown in FIGURE 8 and engages lever 134 in the nearly closed position of drawer 32 to pivot the lever 134 clockwise as viewed in FIGURE 8 out of engagement with pin 138 to release latching levers 124, the disengagement occurring after writing surface 40 has passed inwardly beyond the pen tips 42. In the fully closed position of drawer 32, actuating arm 126 is manually depressed toward the front of drawer 32 whereupon upward angular displacement of the assembly comprising latching levers 124, writing plate 40 and roller 18 will occur to the normal writing position thereof. Such angular positioning of latching levers 124 also causes guide rod 24 to be received in the vertical segment of slots 144 to latch the drawer 32 in its closed position whereupon the recorder is ready for a writing operation.

To open the drawer 32 it is only necessary to release latching levers 124 through manual actuation of arm 126. Downward angular displacement of writing plate 40 and roller 18 will occur simultaneously with release of guide rod 24 from the vertical segment of slot 144 whereupon the drawer may be withdrawn without interference between writing plate 40 and pen tips 42. During outward displacement of the drawer, lever 134 will move out of engagement with guide rod 24 and be released for locking engagement with pin 138 to thereby lock latching levers 124 and the parts carried thereby in the position shown in FIGURE 1 wherein slots 144 are maintained in alignment with guide rod 24 for re-engagement therewith upon subsequent closing of the drawer 32.

Referring now again to the ink supply system, means are provided to angularly displace ink manifold 52 in response to opening and closing movement of drawer 32 to prevent the ink leakage condition previously described. Referring specifically to FIGURE 3, this means comprises an actuating arm 150 fixed to and extending from manifold 52 for pivotal connection to a vertically displaceable connecting arm 152 positioned in a guide slot 154 of a bracket 156 attached to the right side wall of the recorder chassis. Connecting arm 152 is loosely received in slot 154 and biased to one side thereof by a spring 158. An integral shoulder 160 limits upward displacement of the connecting arm 152. With the arrangement shown, vertical displacement of the connecting arm 152 will effect angular displacement of manifold 52. The arrangement is such that in the uppermost position of arm 152 the manifold 52 will be in the angular position shown in FIGURES 5 and 6 to render valve members 110 operative with respect to ports 108. In the lowermost position of arm 152 as shown in FIGURE 3, the manifold 52 will be in the angular position shown in FIGURE 7 wherein valve members 110 are inoperative and the ink supply to pens 14 is terminated.

Connecting arm 152 is arranged to be displayed by latching and unlatching movement of the right latching lever 124, and to this end, is provided with an outwardly bent end portion or lug 162 which is adapted to be received in a recess 164 of said latching lever. When the latching lever 134 is displaced in the closed position of drawer 32 to latch the same as hereinbefore described, recess 164 will effect positioning of lug 162 and upward displacement of arm 152 to rotate the ink manifold to the angular position illustrated in FIGURES 5 and 6.

Upon subsequent unlatching of the lever 124 recess 164 will effect downward displacement of arm 152 and angular displacement of manifold 52 to the position illustrated in FIGURE 7. Accordingly, initial unlatching of the recorder drawer 32 will effect disconnection of the manifold 52 from pens 14. Advantageously the pens 14 are disconnected before downward angular displacement of writing plate 40 occurs during removal of drawer 32 and thus before disengagement of pens 14 with record medium 12.

In FIGURE 3 I have also illustrated schematically the energizing circuit for solenoid 76 and a driving motor 166 adapted to drive roller 30 to position record medium 12. Solenoid 76 and motor 166 are connected in a parallel circuit adapted to be connected to a power source 129 by switch 38 and an additional manually actuated switch 168. Switch 168 is provided with an actuating button 170 mounted on cover 98 and comprises an on-off switch for the ink supply and roller 30 driving means. It is intended that switch 168 will be manually actuated to an open position prior to opening of drawer 32. As previously mentioned, switch 38 is provided to automatically shut off the ink supply and roller 30 during means when the chart supply is exhausted. Advantageously, however, if the operator neglects to open switch 168 prior to opening of drawer 32, switch 38 will open when the chart 12 is moved out of engagement with actuating arm 36 during opening movement of drawer 32 to thereby terminate the ink supply to pens 14 and de-energize motor 166.

While there have been described what at present are believed to be the preferred embodiments of this invention, it will be obvious to those skilled in the art that various changes and modifications may be made therein without departing from the scope of the invention as defined in the appended claims.

What is claimed is:

1. In a writing system for a recorder having at least one marking pen movable relative to a recording medium, the combination comprising: an ink supply manifold connected to the pen to supply recording ink thereto and mounted for rotary motion; a valve member operatively associated with said manifold and supported for movement between positions relative thereto for controlling the supply of ink to the pen; and means for rotating said manifold relative to said valve member to close said valve member to terminate the supply of ink to the pen.

2. In a writing system for a recorder having at least one marking pen movable relative to a recording medium, the combination comprising: a tubular ink manifold rotatably mounted for angular displacement and having a port for supplying to the pen; a valve member mounted for rectilinear movement between open and closed positions relative to said manifold for selectively opening and closing said port to control the flow of ink to the pen; and means for angularly displacing said manifold relative to said valve member to thereby displace said port relative to said valve member to terminate the supply of ink to the pen in said open position of said valve member.

3. In a writing system for a recorder as claimed in claim 2 wherein said valve member comprises a sleeve slidably mounted on said manifold and having an outlet port communicating with said manifold port in said open position of said valve member; and wherein a section of flexible tubing connects said outlet port to the pen.

4. In a writing system for a recorder having a record medium the combination comprising: a plurality of writing pens engageable with the record medium and movable relative thereto; an elongated tubular ink manifold rotatably supported at its ends on the recorder for angular displacement relative thereto; said manifold having a plurality of ports for supplying ink to said pens respectively; a plurality of valve members mounted on said manifold adjacent said ports respectively for independent rectilinear movement axially of said manifold between open and closed positions relative to said ports respectively; said valve members each having an outlet port adapted to communicate with the adjacent manifold port in said open position thereof; flexible conduits connecting said valve outlet ports to said pens, respectively; means for angularly displacing said manifold relative to said valve members to simultaneously move said manifold ports out of communication with said outlet ports respectively to simultaneously terminate the flow of ink to all of said pens.

5. In a writing system for a recorder having a record medium the combination comprising: a plurality of writing pens engageable with the record medium and movable relative thereto; a tubular ink manifold rotatably supported on the recorder for angular displacement relative thereto; said manifold having a plurality of ports for supplying ink to said pens respectively; a plurality of valves positioned adjacent said ports for controlling the supply of ink to said pens, respectively; said valves having a closed condition in a first angular position of said manifold and an open condition in a second angular position of said manifold; and means for angularly displacing said manifold between said first and second positions.

6. An ink writing system for a recorder having an ink source and a plurality of pens movable relative to a record medium comprising: an elongated tubular ink manifold connected to the ink source and having a plurality of axially spaced ports in the wall thereof; means rotatably supporting said ink manifold for angular displacement between first and second positions; a plurality of sleeve valves slidably mounted on said manifold adjacent said ports respectively; each of said sleeve valves having an outlet port and being independently adjustable in said first angular position of said manifold to move its outlet port into and out of alignment with the associated manifold port; flexible conduits connecting said outlet ports to said pens respectively to supply ink thereto upon alignment of said ports; and means for angularly displacing said manifold relative to said valve members from said first to said second position to displace said manifold ports and render said sleeve valves inoperative with respect thereto.

7. In an ink writing system for a recorder as claimed in claim 6 wherein each of said sleeve valves is provided with a flange extending axially thereof and having a pair of slots therein; and wherein pins mounted on a fixed support engage said slots respectively to permit axial displacement of said sleeve valves relative to said manifold and to restrain said valves against angular displacement during angular displacement of said manifold.

8. In a recorder the combination comprising: a recorder chassis; a movable drawer supported on the recorder chassis and adapted to be withdrawn from a closed positon to an outward position; latching means for retaining said drawer in a closed position and releasable to permit withdrawal of said drawer; a record medium supported on said drawer; at least one ink writing pen supported on said chassis for engagment with said record medium in the closed position of said drawer; valve means including a member having a first position for connecting the pens to a source of ink and second position for terminating the connection; and means operative in response to release of said latching means for actuating said member from said first to said second position thereof.

9. In a recorder the combination comprising: a recorder chassis; a movable drawer supported on the recorder chassis and adapted to be withdrawn from a closed position to an outward position; latching means for latching said drawer in said closed position and releasable for withdrawing said drawer; a record medium supported on said drawer; a plurality of ink writing pens supported on said recorder chassis and adapted to engage the record medium in the closed position of said drawer for marking said record medium; an elongated tubular ink manifold rotatably mounted on said recorder chassis having ports in the wall thereof for supplying ink to said pens; a plurality of sleeve valves slidably mounted on said manifold adjacent said parts for rectilinear displacement relative thereto to control the supply of ink to said pens; and means for angularly displacing said manifold relative to said sleeve valves upon release of said latching means to render said sleeve valves inoperative and to terminate the pressure on the supply of ink to all of said pens.

10. In a recorder the combination comprising: a recorder chassis; a movable drawer supported on the recorder chassis and adapted to be withdrawn from a closed position to an outward position; a record medium supported on said drawer; a plurality of ink writing pens supported on said recorder chassis and adapted to engage the record medium in the closed position of said drawer for marking said record medium; an elongated tubular ink manifold rotatably mounted on said recorder chassis; valve means operatively associated with said tubular manifold operative in a first angular position of said manifold to supply ink to said pens and operative in a second angular position of said manifold to terminate the supply of ink to said pens; and means for angularly displacing said manifold from said first to said second position upon withdrawal of said drawer.

11. In a recorder as claimed in claim 10 wherein latching means are provided for latching said drawer in said closed position and releasable for withdrawing said drawer; sad manifold displacing means being actuated by said latching means during release thereof.

12. In a recorder as claimed in claim 11 wherein said latching means comprises a pivotal lever mounted on said drawer for engagement with a part fixed to said chassis; and wherein said manifold displacing means comprises an actuating arm operatively connected to said manifold and positioned to be engaged by said pivotal lever.

13. A balanced hydrostatic ink writing system for a pen writing on a moving strip of record medium, comprising: a pen having a tubular tip whose entire periphery is effectively sealed against the surface of the record medium during a writing operation; means for moving said pen tip across said record medium during a recording operation; a pressurized ink source for said pen tip; valve means between said ink source and said pen tip having a first position for connecting said ink source to said pen tip to supply ink under pressure thereto and a second position for terminating the connection; means for actuating said valve means between said positions; and pressure relieving means independent of said valve means for relieving the pressure between said pen tip and said valve means upon actuation of said valve means from said first position to said second position to prevent leakage of ink from said pen tip under the influence of the remanent pressure in the system when said pen tip is moved out of sealing engagement with the record medium.

14. A balanced hydrostatic ink writing system for a pen writing on a movable strip of record medium comprising: a pen having a tubular tip whose entire periphery engages and is effectively sealed against the surface of the record medium during a writing operation; a pressurized ink source for supplying ink under pressure to said pen tip; bias means for biasing said pen tip against the record medium with sufficient force that the ink pressure is insufficient to break the seal between said pen tip and the record medium surface; valve means interposed between said ink source and said pen tip having a first position for connecting said ink source to said pen tip to supply ink under pressure thereto and a second position for terminating the connection; means for actuating said valve means between said positions; and pressure relieving means independent of said valve means and compirsing an expansible and contractible chamber adapted to undergo volumetric expansion in response to actuation of said valve means from said first to said second position to relieve the remanent pressure between said valve means and said pen tip to prevent leakage of ink from said pen tip upon disengagement thereof with the record medium.

15. A balanced hydrostatic ink writing system for a pen writing on a movable record medium comprising; a pen having a tip in sealing engagement with the record medium during a writing operation; a pressurized ink source for supplying ink under pressure to said pen tip; biasing means for biasing said pen tip against the record medium with sufficient force that the ink pressure is insufficient to break the seal between said pen tip and the record medium surface; valve means interposed between said ink source and said pen tip including a valve member having a first position relative to a valve seat for connecting said ink source to said pen tip to supply ink under pressure thereto and a second position relative to said seat for terminating the connection; conduit means connecting said valve means to said ink source and to said pen tip; means for biasing said valve member toward said second position thereof; an actuating device for effecting movement of said valve member between said positions; means operatively connecting said actuating device and said valve member for transmitting movement therebetween; said means defining an expansible chamber in communication with said conduit means between said valve means and said pen tip adapted to undergo volumetric expansion during actuation of said valve member from said first to said second position to thereby relieve the remanent pressure between said valve means and said pen tip upon termination of the ink supply connection.

16. In a recorder the combination comprising: a recorder chassis; a plurality of ink writing pens mounted on said chassis in the upper portion thereof; a sliding drawer supported on the lower portion of the recorder chassis and adapted to be withdrawn from a closed position to an open position; a strip chart and supporting means therefor mounted on said drawer; said supporting means including a plate over which the chart is moved to be marked by said pens in the closed position of said drawer; a pair of latching levers pivotally mounted on said drawer at opposite sides thereof; said plate extending between said latching levers and fixed at its ends thereto; and means fixed to said chassis adapted to be engaged by said latching levers upon angular displacement thereof; said plate being positioned in an operative position with respect to said pens by said angular displacement.

17. In a recorder the combination comprising: a recorder chassis; chart marking means mounted on said chassis in the upper portion thereof; a sliding drawer supported on the lower portion of said chassis and adapted to be withdrawn from a closed position to an open position; a strip chart and supporting means therefor carried by said drawer; said supporting means including a plate having an operative position in the closed position of said drawer and over which the chart is moved to be marked by said marking means; said plate being positioned to the rear of said marking means in said operative position thereof; and means for displacing said plate to permit withdrawal of said drawer without interference between said plate and said marking means.

18. In a recorder as claimed in claim 17 wherein said displacing means comprises latching means pivotally mounted on said drawer for movement into engagement with a part of said chassis to latch said drawer in said closed position; said plate being connected to said latching means to be displaced thereby during latching and unlatching movement thereof.

19. An ink writing system for writing on a moving record medium when the system is in an operational status, comprising: a pen having a tubular tip whose entire periphery is effectively sealed against the surface of the record medium, means for moving the pen tip across said record medium, a container of viscous ink under pressure, means connecting said supply of pressurized ink to said pen, means biasing said pen tip against said record medium to maintain said pen tip effectively sealed against the said pressure on said ink at said pen tip, pressure relieving means connected to said container of ink, and means for operating said pressure relieving means to reduce substantially to atmospheric pressure the pressure on the ink at the pen tip to change the system from its operational status to a non-operational status.

20. An ink writing system for writing on a moving record medium when the system is in an operational status, comprising: a pen having a tubular tip whose entire periphery is effectively sealed against the surface of the record medium, means for moving the pen tip across said record medium, a container of viscous ink under pressure, means connecting said supply of pressurized ink to said pen, means biasing said pen tip against said record medium to maintain said pen tip sealed against the said pressure on said ink at said pen tip, pressure relieving solenoid operated valve means connected to said supply of ink, and means connected to said solenoid operated valve means to operate same to reduce the pressure on the ink at the pen tip substantially to atmospheric pressure to change the system from its operational status to a non-operational status.

21. An ink writing system for writing on a moving record medium when the system is in an operational status, comprising: a pen having a tubular tip whose entire periphery is effectively sealed against the surface of the record medium, means for moving the pen tip across said record medium, a reservoir of viscous ink, conduit means connecting said ink to said pen, means establishing pressure on said ink at said pen tip when the system is in its operational status, means biasing said pen tip against said record medium to maintain said seal against the said pressure on said ink at said pen tip, pressure relieving valve means to reduce the pressure on the ink at the pen tip substantially to atmospheric pressure to change the system from its operational status to a non-operational status.

References Cited by the Examiner

UNITED STATES PATENTS

| | | | |
|---|---|---|---|
| 2,107,230 | 2/1938 | Bingham et al. | 340—140 X |
| 2,261,596 | 11/1941 | Stroobonts | 251—310 |
| 2,669,501 | 2/1954 | Young et al. | 346—140 X |
| 3,054,109 | 9/1962 | Brown | 346—117 |
| 3,071,772 | 1/1963 | Johnson et al. | 346—140 X |

FOREIGN PATENTS

| | | |
|---|---|---|
| 554,308 | 6/1943 | Great Britain. |
| 919,484 | 2/1963 | Great Britain. |

LOUIS J. CAPOZI, *Primary Examiner.*